United States Patent [19]

Dauerer et al.

[11] Patent Number: 5,751,966
[45] Date of Patent: May 12, 1998

[54] NOTIFICATION OF DISCONNECTED SERVICE MACHINES THAT HAVE STOPPED RUNNING

[75] Inventors: Norman Joseph Dauerer, Hopewell Junction; Edward Emile Kelley, Wappingers Falls, both of N.Y.

[73] Assignee: International Business Machines Corporation, Armonk, N.Y.

[21] Appl. No.: 810,703

[22] Filed: Mar. 3, 1997

Related U.S. Application Data

[63] Continuation of Ser. No. 8,017, Jan. 22, 1993, Pat. No. 5,640,513.
[51] Int. Cl.$^6$ .................................................. G06F 11/30
[52] U.S. Cl. .............................. 395/200.54; 395/200.53
[58] Field of Search ...................... 395/200.54, 200.55, 395/200.33, 184.01, 182.02, 183.01, 185.01–185.1, 200.57

[56] References Cited

U.S. PATENT DOCUMENTS

| | | | |
|---|---|---|---|
| 4,710,926 | 12/1987 | Brown et al. | 395/182.02 |
| 4,800,488 | 1/1989 | Agrawal et al. | 395/200.55 |
| 5,072,370 | 12/1991 | Durdik | 395/184.01 |
| 5,301,270 | 4/1994 | Steinberg et al. | 345/326 |
| 5,329,619 | 7/1994 | Page et al. | 395/200.33 |
| 5,390,326 | 2/1995 | Shah | 395/185.08 |
| 5,640,513 | 6/1997 | Dauerer et al. | 395/200.54 |

*Primary Examiner*—Mehmet B. Geckil
*Attorney, Agent, or Firm*—Graham S. Jones, II

[57] ABSTRACT

A method and system are provided in a software network using a network of disconnected servers for detecting which background data processing functions have stopped running in that network of disconnected servers. The network of disconnected servers is monitored to determine those that contain background data processing functions which have stopped running in servers which remain disconnected. Notification is provided as to which servers have stopped running but remain disconnected and which background data processing functions in the servers have stopped running. The system periodically sends a message to restart servers which contain background data processing functions which have stopped running and remain disconnected.

14 Claims, 4 Drawing Sheets

NOTIFICATION OF DISCONNECTED SERVICE MACHINES THAT HAVE STOPPED RUNNING

This application is a continuation of 08/008,017 filed Jan. 22, 1993 now U.S. Pat. No. 5,640,513.

BACKGROUND OF THE INVENTION

1. Field of the Invention

This invention relates to data processing systems, and more particularly to real and virtual service machines that are operated automatically in response to operations of a real or virtual machine operating system.

2. Description of Related Art

U.S. Pat. No. 4,453,210 of Suzuki et al for a "Multiprocessor Information Processing System Having Fault Detection Function Based on Periodic Supervision of Updated Fault Supervising Codes" states as follows:

"A counter is provided for each of a plurality of processors for holding an associated fault supervising code. The code stored in the associated counter is periodically updated by the associated processor while the update status of the code is supervised on a cycle longer than the cycle of the updating period. If a fault occurs in one of the processors, the fault supervising code corresponding to that processor will not be updated. Thus, the faulty processor can be detected by periodically supervising the update status of the fault supervising code. The supervising operation can be carried out by software or hardware."

It also requires that a number of processors be connected to use a common bus, to share a common load, and to share a common memory.

A DISCONNECTED-but-running service machine (SERVER) in a CP (Central Processor) loaded with CMS (Conversational Monitor System): a VM-based software system of IBM) is an account on the CP system which has a USERID (user identification of an account on the CP system) in a Virtual-Machine (VM) Operating System (OS) environment that operates unattended and disconnected from any terminal (normally) in background of the VM system and will respond to transactions, files or messages (interrupts) that have been sent to it. It will also ACTIVATE, i. e. "wake up", at certain specified dates and/or times and perform a set of predefined functions from a table of functions. Also a DISCONNECTED-but-running service machine does not need a terminal to operate when it is DISCONNECTED.

Normally DISCONNECTED-but-running service machines that have been "LOGGED OFF", that is to say "signed off" from the system are in an inactive DISCONNECTED condition requiring a process of connecting back to the CP mode and then to the CMS mode and which leads into a generic system such as DOS or OS/2 or a competitive operating system or that have stopped running but are still DISCONNECTED have been a recurring problem. The key problem is a DISCONNECTED but not running condition. These service machines (SERVERS) share information in a network and prepare the information to be presented to users. If a service machine (SERVER) in a network goes down (not that the VM system ceases to function, but the information network that consists of the network of DSMs that ceases some of its functions), so the chain of information is broken and information will not get to users.

These interruptions are a critical flaw in any on-line system established exclusively for real-time data exchange, such as the Intersite Line Comparison (ILC) system described in U.S. patent application (FI9-91-037) Ser. No. 07/755,036, filed on Sep. 4, 1991 of Dauerer et al for "Database System for Intersite Line Comparison".

Restarting of the service machines (SERVERS) that have been improperly or accidentally stopped often depends on prompt notification that a machine is down. A SERVER that is down cannot make notifications that it is down and the administrator, which can be a machine (or alternatively in another aspect of the invention, a human being) must depend on other means of finding out that such a condition exists. A SERVER that has stopped running but is DISCONNECTED presents greater difficulties than a SERVER that has merely been LOGGED OFF, since this condition limits the available options of determining the status of the SERVER.

Presently the ability exists to send queries to service machines (SERVERS) to determine their status. If the "message query" is sent from a central USERID, the query will report whether the SERVER is LOGGED OFF from the VM system, LOGGED ONTO the VM system, or DISCONNECTED from the VM system. There are several problems with this method, as follows:

1) The messages are sent in two directions and there may be problems with sending messages in the first direction, i.e. from the central USERID.

2) The query will not detect a condition in which a SERVER is DISCONNECTED and not running.

3) There is no central USERID that will automatically sort out the messages and report on only the down conditions.

Another currently available method is to send a specific transaction, depending on the type of SERVER that is running. This solution has not only all the disadvantages of the first method but has additional problems. For example transactions are slower than message queries, transactions must wait in the queue of the receiving SERVER, and a different transaction must be formulated for each type of SERVER.

An object of this invention is to detect not only the "LOGGED OFF" condition but to detect the "DISCONNECTED but not running" condition, and automatically to notify the appropriate users, whether they are operator stations for humans or machines whether they are machines, to take the appropriate action to restart the SERVERs.

Another object of this invention is to provide DSMs with independence.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
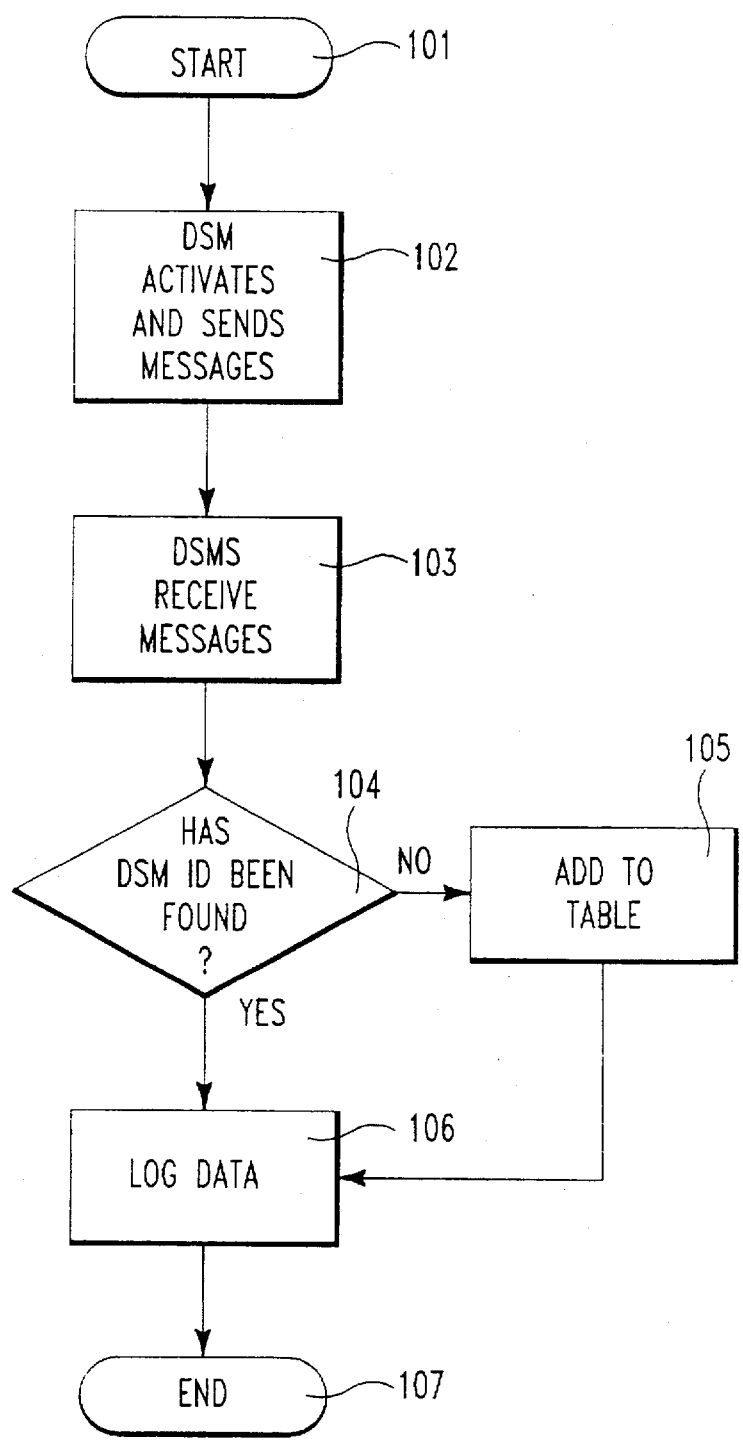
FIG. 1 shows a flowchart for sending messages from a central service machine and for receiving messages at the central service machine.

DISCONNECTED SERVERs that have stopped running cause data not to be processed. This invention solves the problem of lost or interrupted data flow that occurs when DISCONNECTED SERVERs have been LOGGED OFF or have stopped running; but the Disconnected servers are still DISCONNECTED.

The invention is a programming system that will determine whether DISCONNECTED SERVERs have been LOGGED OFF or have stopped running and remain DISCONNECTED in the logged on condition. Each SERVER in a network of DISCONNECTED SERVERs will periodically send messages to a central USERID SERVER. Any number of SERVERs in the network may be designated as a central SERVER. The purpose is to provide backup to the central SERVER, report on the central SERVER and for the desirability of having the complete network status on particular nodes (INDIVIDUAL VM MACHINES IN A VM NETWORK). The central service machine will log the date and time that the messages were received. Although the SERVERs may be of different types, a common transaction will be sent throughout the network.

At predetermined times, the central SERVER will ACTIVATE, i.e. "wake up", and check the dates and times the messages arrived from the other service machines and compare such times to its present time. If the difference exceeds a preset allowable delta, then administrative USERIDs are notified of a potential "machine down" condition of such SERVERS. When the SERVER that is down is restarted, a follow on message to the administrative USERIDs notifies them that the SERVER is up and running.

Any authorized USERID can request, at any time, a table showing the latest dates and times when the DISCONNECTED SERVERs checked in to the central SERVER of the network. There is also a secondary SERVER that checks on the central SERVER to see if it has stopped running. Any number of SERVERs in the network may be designated as a secondary SERVER. A secondary server may act as a secondary server to a secondary server. This may be repeated indefinitely. If the central SERVER has a "machine down" condition, the secondary SERVER will function in the same manner as the central SERVER by notifying the administrative USERIDs.

The invention is a programming system that will determine whether DISCONNECTED SERVERs have been LOGGED OFF or have stopped running and remain in the DISCONNECTED status in which status they can respond and act without being connected to a terminal.

When DSMs are logged off or have stopped running, they cannot respond.

Each SERVER in the network will periodically send messages to a central USERID SERVER in a network of DISCONNECTED SERVERs. Any number of service machines in the network may be designated to be a central SERVER. The purpose is to provide backup to the central SERVER, report on the central SERVER and report on the desirability of having the complete network status on particular nodes. Another reason would be to have a local server report on a subset of DSMs in the network. Once a SERVER has sent the message the sending time is logged in a time table that is used to determine when the next message is to be sent.

Sometimes the time tables may get out of sequence because a computer CPU in a network of CPU's may have been brought down for maintenance or system support. If the message is to be sent on the hour and the system has been down for 2 hours and 34 minutes, the system will send the message immediately, then the times file will be set to the nearest previous hour. This insures that the message will go out on the hour rather than every time the clock indicates 34 minutes after the hour.

The central SERVER will log the date and time that the messages are received. Although the SERVERs may be of different types, a common transaction will be sent throughout the network. This common transaction is a message rather than a file, because a message has a higher priority and travels much faster through the network.

At prescribed times the central SERVER will ACTIVATE "wake up" and check the dates and times the messages arrived from the other SERVER and compare these times to its present time. In order to simplify the time comparison, the date is listed as the number of days since the beginning of the century (33631). The date is also listed as yyyymmdd (19920203) in the table for easy reading. The time is listed in hhmmss (13:58:44, hours, minutes, seconds) sequence reading and in the number of seconds since midnight (50324) for computational reasons.

When the difference exceeds the preset allowable delta, the USERID table is flagged with a "down" indicator and administrators are sent a file indicating a "machine down" condition. A single notice is sent. Even though the machines may remain in a "down" condition each time the central SERVER checks the status, no more "machine down" notices will be sent. When the machine that is down is restarted and the central SERVER is notified, then the administrative USERIDs are notified that the machine is up and running and the "down" indicator is changed to an "up" indicator.

Any authorized USERID can request, at any time, a table showing the latest dates and times when the DISCONNECTED SERVERs checked in with the central SERVER. The table is requested by entering a simple command which results in a message being sent to the central SERVER. The central SERVER checks to see if the sender is authorized, then sends the table. The requesting USERID automatically receives the table and then displays it. An example of the table indicating the time and data table is as follows:

| NODE | USERID | STATUS | DATE | TIME | DAYS | SEC. | SEND |
|---|---|---|---|---|---|---|---|
| BTVMANVM_MLCLZNEB | | UP | 19920129 | 13:58:44 | 33631 | 50324 | N |
| CLTVM3_CATOOLS | | UP | 19920129 | 13:57:34 | 33631 | 50254 | N |
| FSHVMDC_BATMLC | | UP | 19920129 | 13:59:33 | 33631 | 50373 | Y |
| FSHVMX_MLCLINET | | DOWN | 19920126 | 11:01:41 | 33628 | 39701 | N |
| FSHVM1_MLCLINES | | UP | 19920129 | 14:00:34 | 33631 | 50434 | N |
| FSHVM1_MLCLINET | | DOWN | 19920126 | 12:00:35 | 33628 | 43235 | N |
| FSHVM1_SCTOOLS | | UP | 19920129 | 14:00:36 | 33631 | 50436 | N |
| PKMFGVM5_BLTOOLS1 | | UP | 19920129 | 14:01:41 | 33631 | 50501 | N |
| SDFVM001_MLCTOOLS | | UP | 19920129 | 14:00:48 | 33631 | 50448 | N |

FIRST FIELD Sending node connected to the USERID.

SECOND FIELD This is either "down" or "up" and is a status indicator.

THIRD FIELD This is the date in yyyymmdd format.

FOURTH FIELD This is the time in "hh:mm:ss" format.

FIFTH FIELD This is the date expressed in days since the beginning of the century.

SIXTH FIELD This is the time expressed in seconds since midnight.

SEVENTH FIELD This indicates whether to send a file indicating the machine has recently been brought down. A 'YES' indicates a file must be sent?.

There is a double check, in that a secondary SERVER checks on the central SERVER to see if it has stopped running. If it has stopped running, the secondary SERVER will notify administrative USERIDs of the status of the central SERVER in the same manner as the central SERVER.

A DISCONNECTED SERVICE MACHINE will be referred as a DSM. The plural of DSM is DSMs. A SERVICE MACHINE is also known as a "SERVER" so, a DSM is also a "DISCONNECTED SERVER".

SENDING AND RECEIVING MESSAGES

FIG. 1 shows a flowchart for sending messages from a central service machine and for receiving messages at the central service machine.

OPERATION 101

Start the sending and receiving of messages part of the system.

OPERATION 102

Any and all DSMs periodically ACTIVATE(S), wake(s) up, and check(s) a table to see where to send its check-in message. Each DSM may have different activation (wake-up) periods. A check-in message consists of the date, time, node, USERID and the program to be executed upon receipt of the message.

OPERATION 103

The receiving DSMs all receive the messages and invoke the sm0057 (Central network status table) program. The sm0057 data table (Central network data table) is used by the central(s) service machine(s) (CENTRAL SERVER) to log when a msg (message indicating that the machine is active) has been received. It is also used to indicate whether a msg has not been received during the proscribed time period. The sm0057 data table also indicates whether a "down" machine has generated a notify msg to the appropriate parties. Note: the table provides the facility to send only one "down" msg until the machine is restarted.

The sm0057 table (Network Status Table) is also used when inquires are made to the service machine for a list of the status of all the service machines.

Note: In its simplest configuration there is only one CENTRAL SERVER (central service machine). More complicated configurations are possible which may have from 1 to 'N' CENTRAL SERVERS (central service machines.) The service machines may be placed in a network where each service machine is a peer to the other service machines or the service machines are subordinate to one and other. A combination of the two setups is also possible.

OPERATION 104

The sm0057 (Central network status) program checks to see if the sm0057 (central network status) data table has the sending address, i.e. DSM ID.

OPERATION 105

If the sending node and USERID are not in the sm0057 data table, an entry is added which includes the sending node, USERID, up or down status indicator, date in yyyymmdd sequence, time of day in hhmmss sequence, number of days since the beginning of the century, number of seconds since midnight and a send file indicator.

OPERATION 106

If the sending node and USERID is found in the table then the sm0057 data table entry is the same information as found in operation 105 and is logged to the record that contains the sending node and USERID.

OPERATION 107 End the system.

PROCESSING OF RECEIVED MESSAGES

Figure 2:
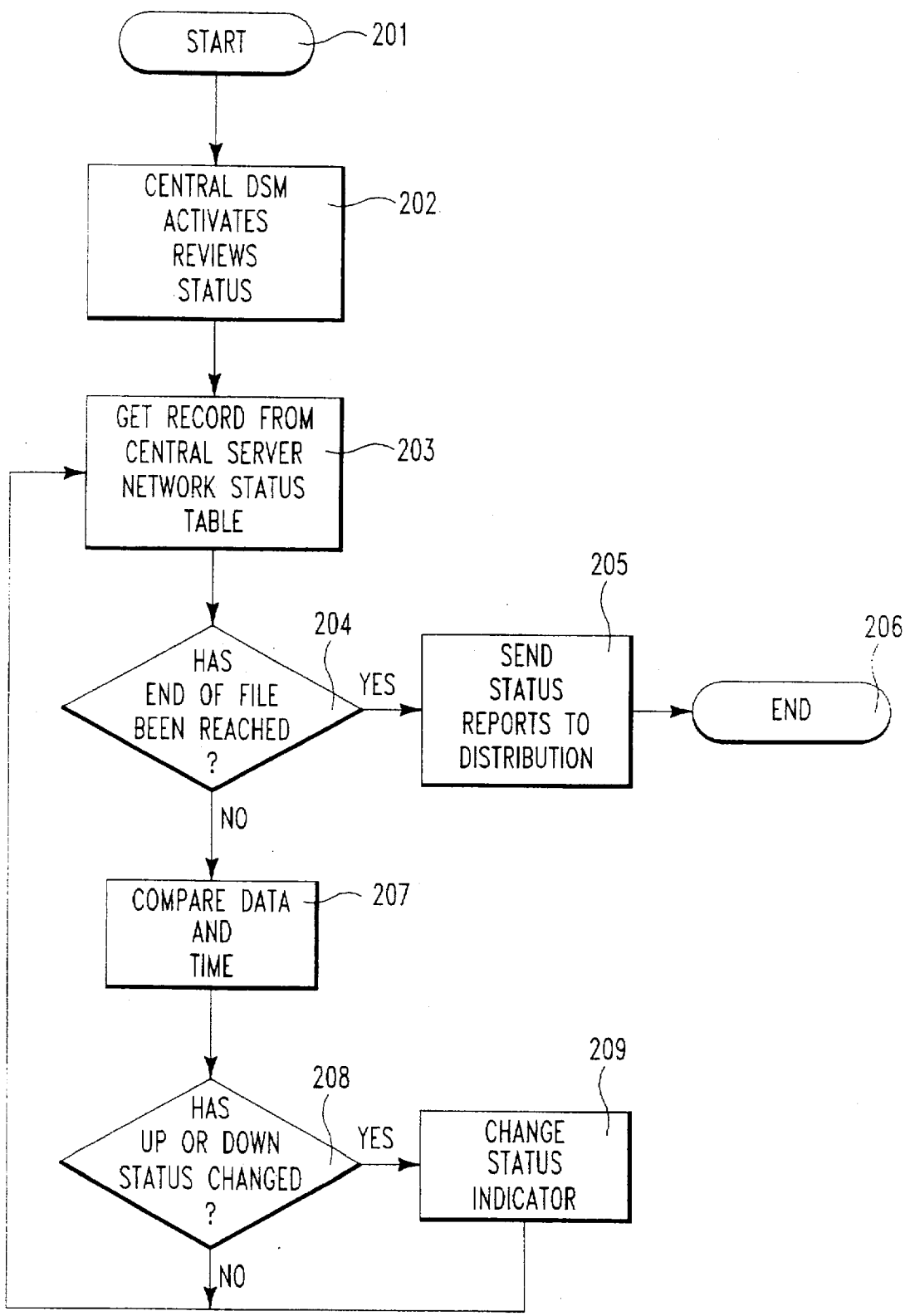
FIG. 2 is a flow chart for processing of received messages by a central service machine.

FIG. 2 is a flow chart for processing of received messages by a central service machine.

OPERATION 201

Start the processing of received messages part of the system.

OPERATION 202

The central DSMs will periodically ACTIVATE (wake up) and review the status of the sm0057 data table. The ACTIVATION ("wake-up") periods are independent on each central DSM.

OPERATION 203

A record is retrieved from the sm0057 data table.

OPERATION 204

Check for an end of file condition

OPERATION 205

Check the report distribution table and send notifications of a down or an up status. A down status is sent only once, even if continuing down status messages are generated. An up status is also sent only once, when the DSM comes back on line.

OPERATION 206

End the system.

OPERATION 207

If the end of file condition is not reached, then compare the date on the sm0057 data table with the present data to determine an up status or a down status. Subtract the time on the sm0057 data table from the present time and compare the time deviation allowed for the sending node and USERID. There is a standard default deviation and an a way of overriding the standard default deviation with a unique deviation for each sending node and USERID.

OPERATION 208

Check if new up or down status has been indicated by operation 207.

OPERATION 209

Change the status indicators for the DSM with the changed status.

Although the concept of a DISCONNECTED SERVER applies to the VM environment this invention may also be used in other similar operating systems.

A feature of this invention is that each DSM has an independent memory and can have an independent clock and is free to operate asynchronously.

Figure 3:
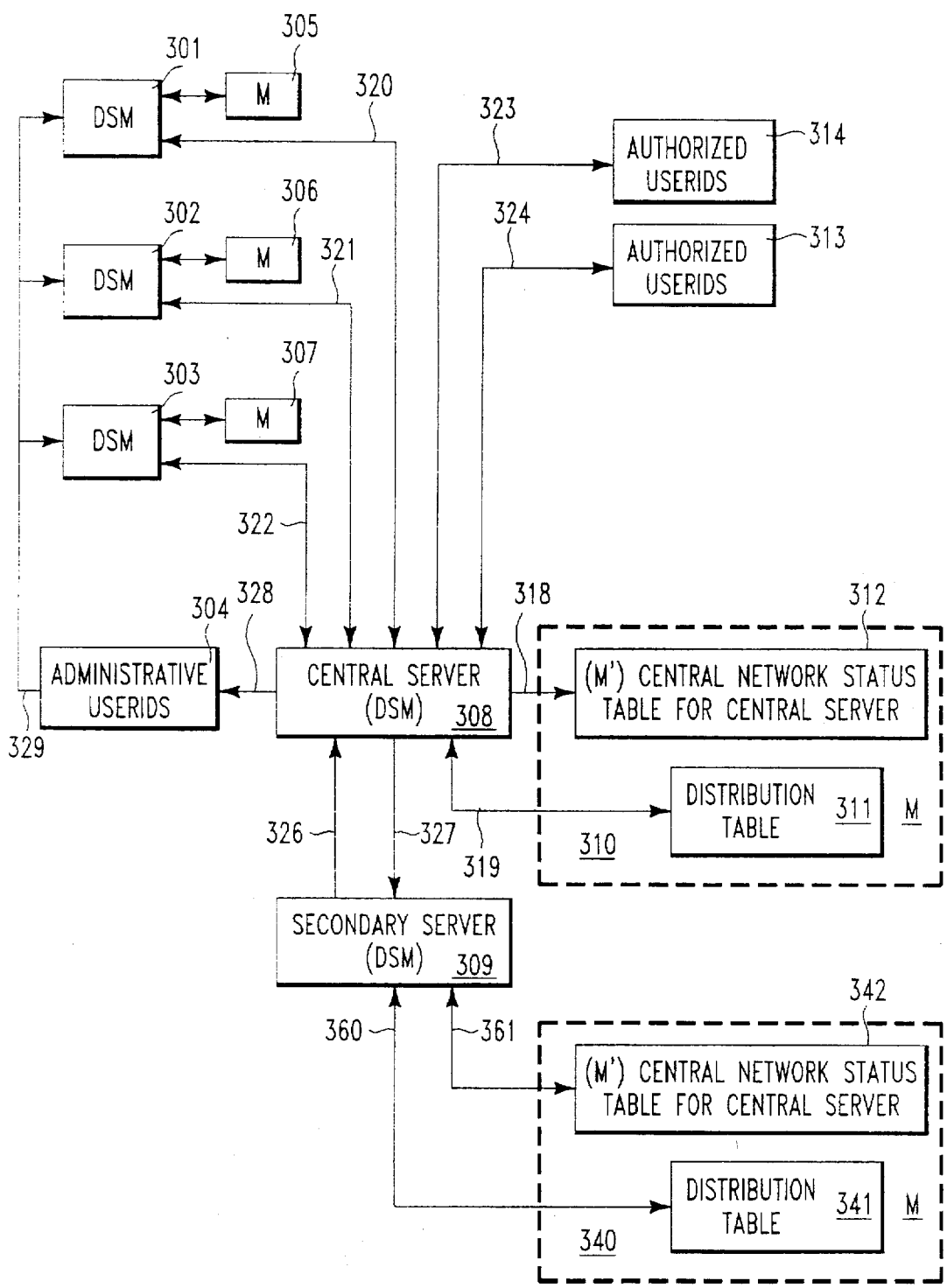
FIG. 3 shows a system embodying this invention with a single central service machine.

FIG. 3 shows a system embodying this invention with a single central service machine. A central service machine (DSM), referred to hereinafter as central server 308, is connected to four DSM's 301, 302, 303 and secondary server 309 as well by means of lines 320, 321, 322 (and 326 and 327 for secondary server 309) respectively. The secondary server 309 reports on the status of the central server 308, in the event it is unavailable at a given time, e.g. logged off or out of operation. Memory units 305, 306, and 307 are connnected respectively to DSM's 301, 302, and 303.

The central server 308 is connected to authorized userids 313 and 314 by lines 324 and 323 respectively. Central server 308 has a memory M' 310 including a Central network status table 312 and a distribution table 311 in its memory, "M" 310. Memory 310 is connected to central server 308 by lines 318 and 319 which connect to table 312 and table 311 respectively in memory 310.

Secondary server 309 has a memory "M" 340 comprising a Central network status table 342 and a distribution table 341 in its memory, "M" 340. Memory 340 is connected to secondary server 309 by lines 360 and 361.

The central server 308 is also connected to the administrative userids 304 by line 328. There are connections by lines 329 from administrative userids 304 to each of the DSM units 301, 302 and 303 which makes it possible for the administrative userids function to restart the DSM's when they are down, in response to the notification from central server 308.

Figure 4:
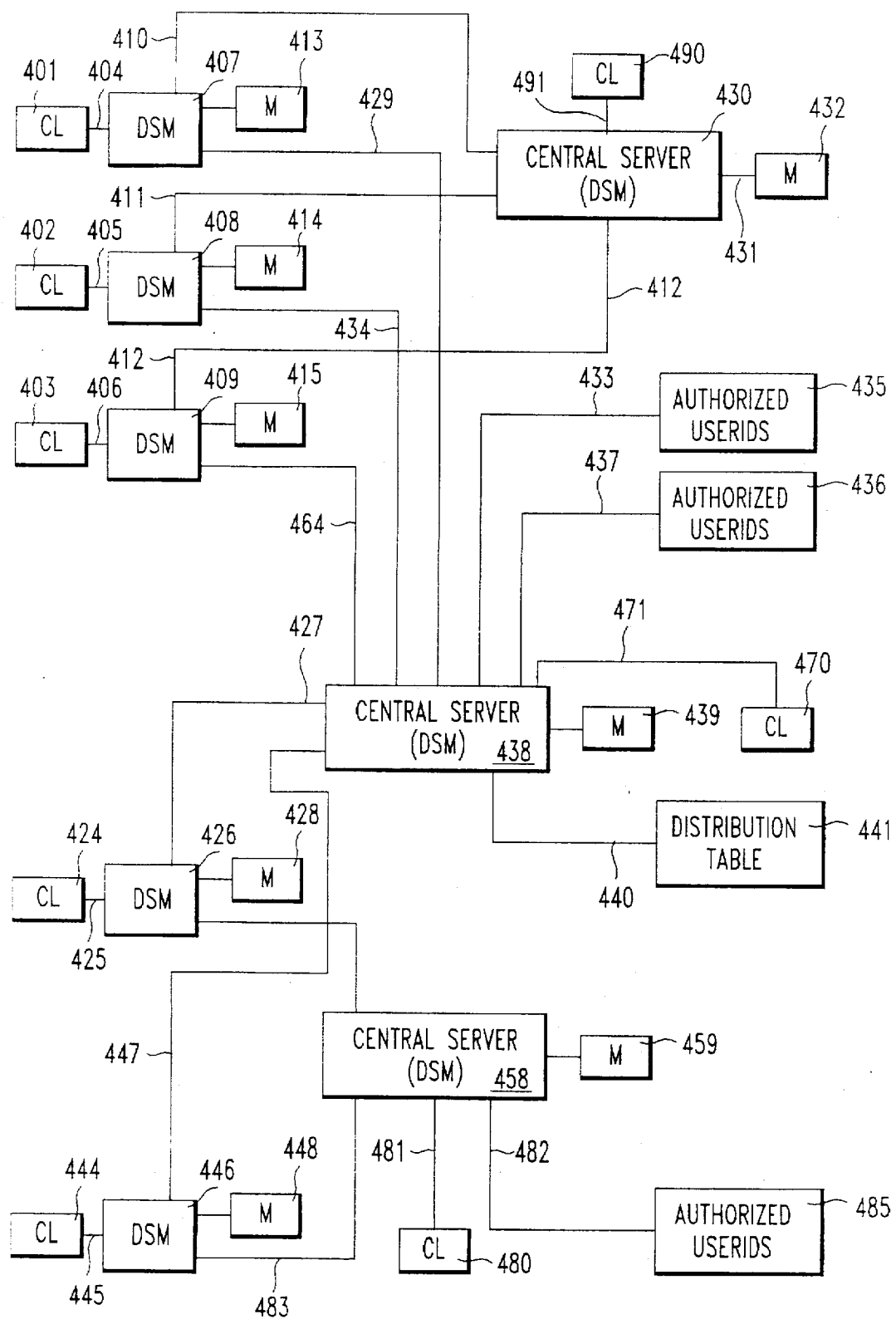
FIG. 4 shows a system embodying this invention with a plurality of central service machines.

FIG. 4 shows a system embodying this invention with a plurality of central service machines. Referring to FIG. 4, central server (DSM) 430 is connected by line 431 to memory 432. It is synchronized by clock 490 connected thereto by line 491. DSM 407, DSM 408, and DSM 409 are connected to central server 430 by line 410, line 411, and line 412 respectively. Clock 401, clock 402, and clock 403 are connected respectively by line 404, line 405, and line 406 to DSM 407, DSM 408, and DSM 409, which are in turn connected respectively to memory 413, memory 414, and memory 415. A second central server (DSM) 438 which is connected to a memory 439, is connected to central server 430 as well as DSM's 426 and 446 via line 427 and line 447 respectively. Clock 424 and clock 444 are connected respectively by line 425 and line 445 to DSM's 426 and 446 to operate them in proper timing. Memory 428 and memory 448 are connected to DSM's 426 and 446 respectively. Server 438 is also connected to DSM 407, DSM 408, and DSM 409 via line 429, line 434 and line 464 respectively. Line 433 connects authorized Userids 435 and line 437 connects Authorized Userids 436 to central server 438 which has a clock 470 connected thereto by line 471. The central server 438 is connected by line 440 to distribution table 441.

The third central server (DSM) 458 has a memory 459, and a clock 480 connected thereto by line 481. The third central server 458 is connected by line 474 to DSM 426. Line 482 connects server 458 to authorized Userids 485 which is adapted to be connected to activate the DSM's associated therewith as in FIG. 3. Central server 458 is connected by line 483 to DSM 446.

SUMMARY OF FEATURES OF SYSTEM AND PROGRAM

1. A common transaction is sent from DSMs which are of different types and are running different programs.
2. The time tables on the sending machines that have gotten out of sequence with the clocks are reset by the system using the central network status table.
3. Only one notification from the central server is sent when a machine is down.
4. A notification from the machine is sent when the machine is brought up.
5. A self generating sm0057 data table is provided. This table does not have to be initialized at any time, even when new DSMs are added to the network.
6. Variable times are employed to check on each DSM.
7. Variable times are employed to send messages for each DSM.
8. The method of computation converts the days to the beginning of the to the beginning of the century and the time to the number of seconds since midnight.
9. Each central and secondary DSM has its own independent distribution table.
10. Each central and secondary DSM has its own independent sm0057 table.

While this invention has been described in terms of the above embodiment(s), those skilled in the art will recognize that the invention can be practiced with modifications within the spirit and scope of the appended claims.

Having thus described the invention, what is claimed as new and desirable and desired to be secured by Letters Patent is as follows:

1. A computer system including,
    a central service machine connected to a network of disconnected-but-running service machines,
    said disconnected-but-running service machines process data after said data have been delivered thereto and process data which is resident therein independently of control by said central service machine said disconnected-but-running service machines provide background data processing functions,
    each service machine sending a status message to said central service machine periodically,
    means for monitoring of said network of disconnected service machines by said central service machine to determine those background data processing functions that have stopped running but remain disconnected, and
    means for providing notification from said central service machine as to which service machines which have a background data processing function which has stopped running in a service machine which remains disconnected.

2. A computer system in accordance with claim 1 wherein only one notification is sent from said central service machine when a said service machine background data processing function is down and not running.

3. A computer system in accordance with claim 1 wherein a notification is sent when a said background data processing function in a service machine is brought up and running from a down and not running condition.

4. A computer system in accordance with claim 1 including a plurality of central service machines wherein at least one said central service machine comprises a disconnected-but-running service machine.

5. A computer system in accordance with claim 1 wherein at least one central disconnected service machine is provided, and each said central machine has its own independent distribution table.

6. A computer system in accordance with claim 1 wherein at least one central disconnected service machine is provided,
    each said central machine has its own independent distribution table, and
    each said central machine performing the step of recording the status of background data processing functions in its own independent network status table for recording the status of background data processing functions in said disconnected machines in the system.

7. A computer system in accordance with claim 6 wherein:
    when a background data processing function in a service machine has been down and not running and is restarted then said service machine sends a message that it is up and running.

8. A system in accordance with claim 1 wherein:

there is a background data processing function in a service machine which has been down and not running and is restarted then said service machine sends a message that it is up and running.

9. A method of operating a software network including:

a network of disconnected-but-running service machines which provide background data processing functions and a central service machine, the step is performed of each service machine sending a status message to said central service machine independently, asynchronously, and periodically, the step is performed of monitoring of said network of disconnected service machines by said central service machine to determine background data processing functions which have stopped running in service machines which remain disconnected, and the step is performed of providing notification from said central service machine as to which background data processing functions in said service machines have stopped running in service machines which remain disconnected.

10. A method in accordance with claim 9 including:

said disconnected service machines having timing means for determining when the next message is to be sent, said timing means being dependent upon at least one computer in a network, and the step of resetting of said timing means on said service machines that are out of sequence because a said background data processing function in said network is down.

11. A method in accordance with claim 10 including:

the step of providing only one notification from said central service machine when a said service machine background data processing function is down.

12. A method in accordance with claim wherein:

a service machine which has been down and is restarted then sends a message that said background data processing function is up and running.

13. A method in accordance with claim 12 wherein:

said central service machine performs the steps of receiving messages from other service machines and checking the dates and times the messages arrived from the other service machines and comparing these times to the present time, and if the difference exceeds a preset allowable delta, then said central service machine performing the stop of providing a notification of a potential background data processing function down condition to other service machines.

14. A method in accordance with claim 13 wherein:

the step is performed of providing a background data processing function in a service machine is restarted after being down, and the step of sending a follow on message is sent notifying service machines that the background data processing function in said service machine which had been down in now up and running.

* * * * *